F. L. TRUDEAU.
NUT LOCKING PLATE.
APPLICATION FILED OCT. 8, 1913.
1,123,037.
Patented Dec. 29, 1914.
2 SHEETS—SHEET 1.
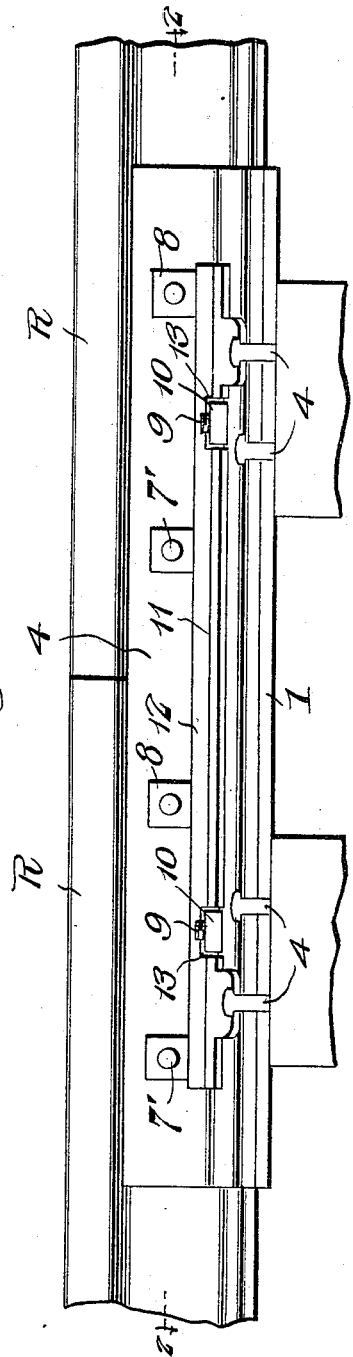
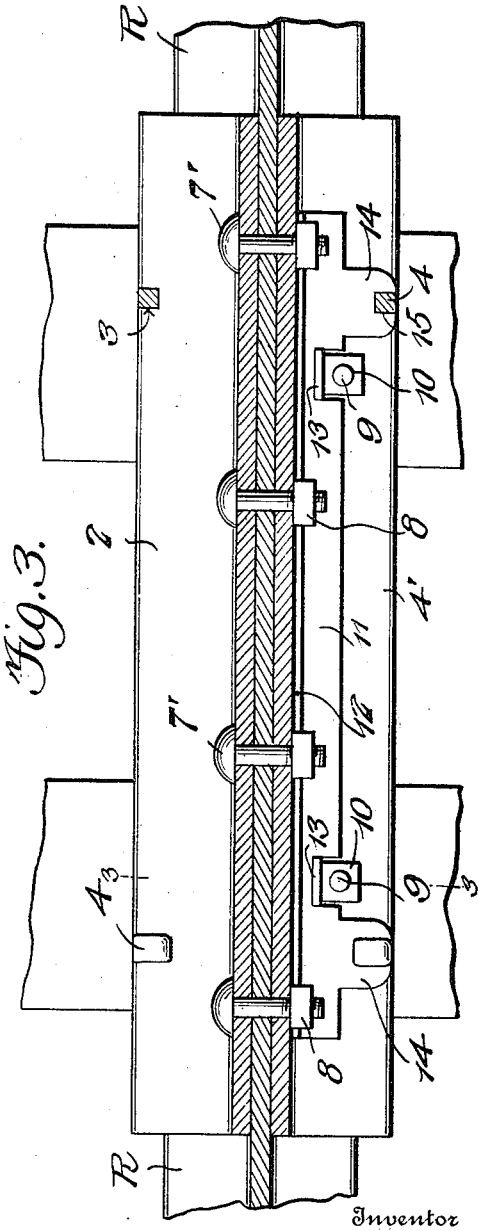
Witnesses
Hugh H. Ott
Inventor
F. L. Trudeau
By Victor J. Evans
Attorney F. L. TRUDEAU.
NUT LOCKING PLATE.
APPLICATION FILED OCT. 8, 1913.
1,123,037.
Patented Dec. 29, 1914.
2 SHEETS—SHEET 2.
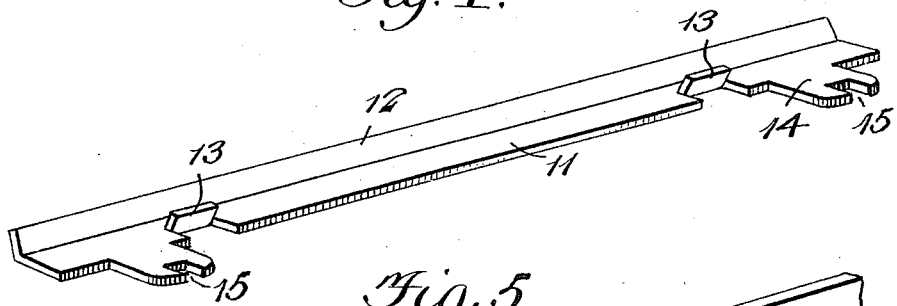
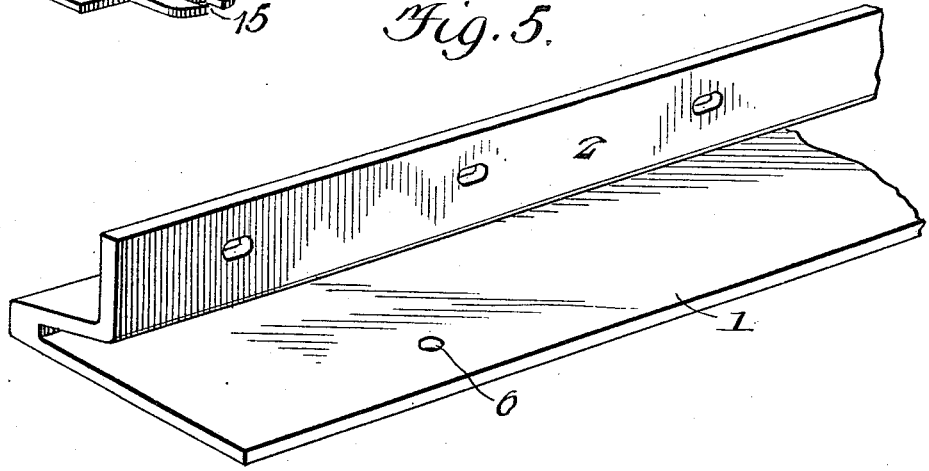
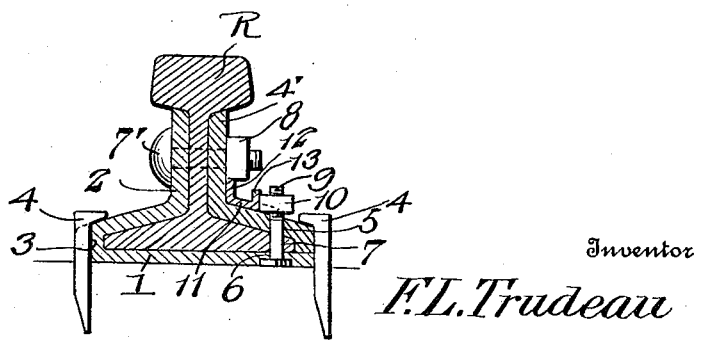
Witnesses
Hugh H. Ott
Inventor
F. L. Trudeau
By Victor J. Evans
Attorney

UNITED STATES PATENT OFFICE.

FELIX L. TRUDEAU, OF STOCO, ONTARIO, CANADA.

NUT-LOCKING PLATE.

1,123,037. Specification of Letters Patent. Patented Dec. 29, 1914.

Application filed October 8, 1913. Serial No. 794,117.

*To all whom it may concern:*

Be it known that I, FELIX L. TRUDEAU, a citizen of Canada, residing at Stoco, in the Province of Ontario and Dominion of Canada, have invented new and useful Improvements in Nut-Locking Plates, of which the following is a specification.

The present invention relates to improvements in means for locking a nut upon a bolt, and particularly to a locking plate for securing the joint sustaining nuts and bolts against accidental removal incident to the vibration imparted by the rolling stock passing over the joint.

With the above recited objects in view, and others which will appear as the nature of the invention is more fully understood, the improvement resides in the construction, combination and arrangement of parts set forth in the following specification and falling within the scope of the appended claim.

In the drawings: Figure 1 is a side view of two rails connected together in accordance with the present invention, the locking plate being shown in engaging position with the nuts and bolts. Fig. 2 is a transverse sectional view on the line 3—3 of Fig. 3, Fig. 3 is a horizontal sectional view on the line 2—2 of Fig. 1, Fig. 4 is a perspective view of the nut locking plate, Fig. 5 is a perspective view of a portion of the member 2.

Referring now to the drawings in detail, R—R designate two rail ends which rest upon the base flange 1 of an angular member 2, the angular portion of the said member having its inner face shaped to engage with the base flanges as well as within the fishing spaces upon one of the sides of the rails.

The outer longitudinal edge of the flange member 1 is provided, at spaced intervals, with spike holes 3 which are adapted to receive securing spikes 4, whereby the face of the said member 2 may be fastened to the ties T.

An angle plate 4' is provided for the opposite sides of the rails, and the said angle plate has its longitudinal flange provided with openings 5, which are adapted to register with similar openings 6 in the base plate 1 and also with openings 7 provided in the base flanges of the rails. The vertical members of the elements 2 and 4' are further provided with openings which register with openings in the webs of the rails, and passing through the last mentioned openings are transversely arranged bolts 7' provided with securing nuts 8, the nuts 8 bearing against the vertical flange of the plate 4'. The registering openings in the horizontal or flanged member of the plate 4', the base flanges of the rails and those provided in the base plate 1 are adapted to receive the upwardly extending stems of bolts 9 which are provided with nuts 10. If desired, the securing elements 9 and 10 may be applied to both sides of the rails, and the longitudinal edges of both the plate 1 and the flanged or lower portion of the angle bar 4' are provided with holes for the reception of securing spikes.

The numeral 11 designates the nut retaining or locking plate. The plate comprises a rectangular member which preferably has its inner edge upset or otherwise provided with a longitudinally extending inclined lip 12. The opposite longitudinal edge of the plate is slit at intervals, the portions between the slits being upturned to provide lips 13, while the said edge of the locking member formed with the lips 13 is, adjacent its ends, integrally provided with outwardly extending portions 14, the longitudinal edges of which are notched, as at 15, and the said notches being adapted to register with the end notches in the rail joint provided with the end spikes. The lips 13 correspond in number with the nuts 10, and the said lips are inclined in an opposite direction from that of the ledge or flange 12, both the lips and the flange being inclined outwardly of the plate proper. When the nuts and bolts are assembled, as previously described, the plate 11 is arranged upon one or both of the angular members providing the joint, and, as the plate is constructed of resilient material, the flange 12 will underlie the nuts 8, the said plate being inserted at an angle so that its lips will overlie the nuts 10. By forcing the plate downwardly, the inclined flange 12 will assume almost a vertical position as will the lips 13, and a tension is at all times retained between the said flange and lips, so that none of the nuts or bolts may become accidentally loose. When the spikes are inserted within the notches 15 of the end extensions 14, the plate or plates 11 will be effectively secured to the ties against accidental danger of removal or against danger of the engaging members of the plate or plates becoming disconnected.

From the above description, taken in connection with the accompanying drawings, the simplicity of the device, as well as the advantages thereof will, it is thought, be perfectly apparent to those skilled in the art to which such inventions appertain without further detailed description.

Having thus described the invention, what I claim is:

In combination with an angle plate and a member adapted to be connected with the plate, bolts passing through the vertical portion of the angle plate and through the member, nuts for the bolts arranged upon the angle plate, bolts passing vertically through the horizontal portion of the angle plate, nuts for these bolts, of a lock plate for the nuts, said lock plate including a flat horizontal portion having one of its longitudinal edges formed with an outwardly inclined spring flange and which is adapted to underlie the nuts of the transversely arranged bolts, the horizontal portion of the lock plate having slots to receive the nuts of the vertical bolts, the inner walls provided by the said slots having outwardly inclined spring lips, which bear against the nuts of the said vertical bolts, and securing elements passing through the horizontal portion of the nut locking plate and the angle bar for securing the locking plate tightly against the said angle plate and engaging portions of the locking plate against the nuts.

In testimony whereof I affix my signature in presence of two witnesses.

FELIX L. TRUDEAU.

Witnesses:
 LEVI LATON,
 JAMES COLBEY.

Copies of this patent may be obtained for five cents each, by addressing the "Commissioner of Patents, Washington, D. C."